UNITED STATES PATENT OFFICE.

FRANCIS E. J. LITOT, OF WILKINSBURG, PENNSYLVANIA.

SOLDERING FLUX.

1,188,188.

Specification of Letters Patent.

Patented June 20, 1916.

No Drawing. Application filed March 22, 1915. Serial No. 16,252.

*To all whom it may concern:*

Be it known that I, FRANCIS E. J. LITOT, a resident of Wilkinsburg, in the county of Allegheny and State of Pennsylvania, have invented a new and useful Improvement in Soldering Flux, of which the following is a specification.

This invention relates to a soldering flux, for use in soldering tin, sheet metal articles, copper, aluminum or any other metal which can be united by soft solder by anyone versed in the art of soldering.

The purpose of the invention is to provide a flux which will thoroughly cleanse the surfaces to be soldered so as to form a strong and enduring joint. The principal ingredient of the solder is stearin, or stearil acid, or any animal fat, or product thereof together with chlorid of zinc. These ingredients may be combined in various proportions, an excellent proportion being 18 to 20 parts of chlorid of zinc to 100 parts of stearin or other animal fat. A vehicle of any kind may, if desired, be added, such as vaseline, when it is desired to make the flux in the form of a paste. When the flux consists mostly of stearin or stearin and chlorid of zinc, it is fairly hard and can be formed into sticks which makes it easy to apply, even in places where it is difficult or almost impossible to use a fluid or semi-fluid flux.

The proportions of the ingredients may be varied within considerable limits without departing from the spirit of the invention.

What I claim is:—

A soldering flux composed of an animal fat and chlorid of zinc in the approximate proportion of one part of chlorid of zinc to five parts of fat.

In testimony whereof I have hereunto set my hand.

FRANCIS E. J. LITOT.

Witnesses:
 GLENN H. LERESCHE,
 WILLIAM B. WHARTON.